United States Patent [19]

Vaught

[11] Patent Number: 4,861,125
[45] Date of Patent: Aug. 29, 1989

[54] SUSPENSION ASSEMBLY FOR A SCANNING MIRROR

[75] Inventor: John L. Vaught, Palo Alto, Calif.

[73] Assignee: Tencor Instruments, Mountain View, Calif.

[21] Appl. No.: 190,760

[22] Filed: May 6, 1988

[51] Int. Cl.$^4$ ............................................. G02B 26/10
[52] U.S. Cl. .................................... 350/6.6; 350/487; 350/631
[58] Field of Search .................. 350/6.1, 6.5, 6.6, 484, 350/486, 487, 500, 631, 632

[56] References Cited

U.S. PATENT DOCUMENTS

| | | | |
|---|---|---|---|
| 3,932,809 | 1/1976 | Frank | 324/96 |
| 4,025,203 | 5/1977 | Lee | 350/487 |
| 4,316,648 | 2/1982 | Lissack | 350/6.6 |
| 4,347,530 | 8/1982 | Stetson | 358/113 |
| 4,708,420 | 11/1987 | Liddiard | 350/6.6 |
| 4,732,440 | 3/1988 | Gadhok | 350/6.6 |
| 4,802,720 | 2/1989 | Paulsen | 350/486 |

FOREIGN PATENT DOCUMENTS 553571  6/1977  U.S.S.R. ............... 350/6.6

Primary Examiner—Bruce Y. Arnold
Assistant Examiner—Ronald M. Kachmarik
Attorney, Agent, or Firm—Thomas Schneck

[57] ABSTRACT

An optical scanning device for flaw detection or the like having a suspension system including at least two pairs of flexure legs. A first pair has flexure legs diagonally crossed in spaced-apart relation and fixed at one end to a stationary body and at an opposite end to a vibratory body. A second pair of spaced-apart cross-flexure legs link the stationary base to a magnetic driver for varying the angular position of the vibratory body about an axis of rotation. Each of the four flexure legs has a radial stiffness exceeding a torsional stiffness. The first pair of cross-flexure legs and the supported mass have characteristics corresponding to the characteristics of the second pair of cross-flexure legs and associated mass, thereby providing identical resonant frequencies of distortional bending. Any torque exerted on the stationary base by the first pair of cross-flexure legs is compensated by a torque which is equal in magnitude but opposite in direction translated through the second pair of flexure legs.

16 Claims, 2 Drawing Sheets

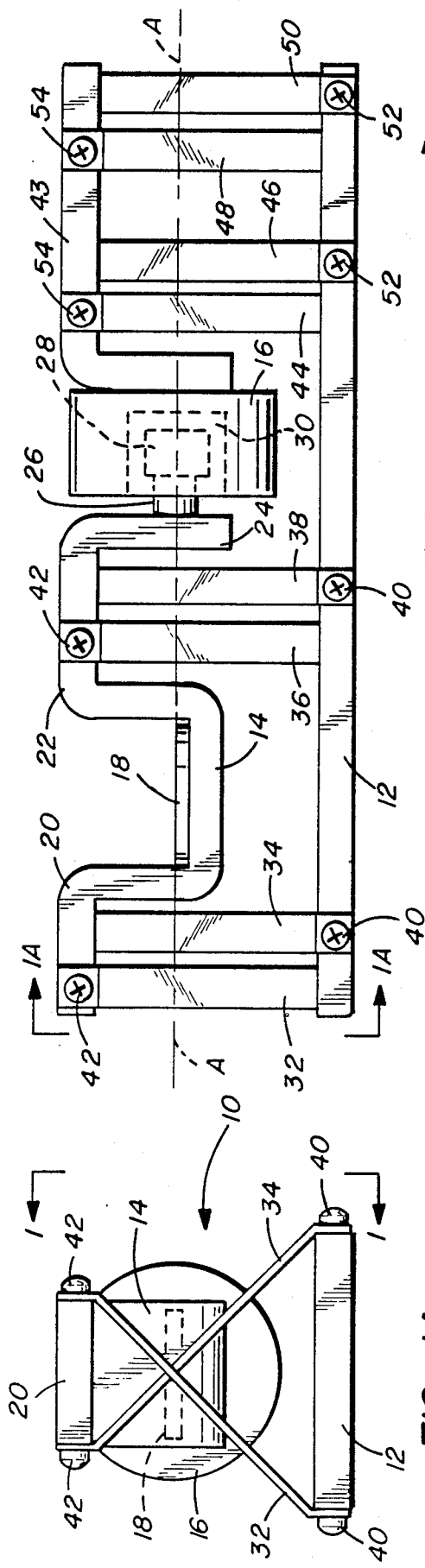
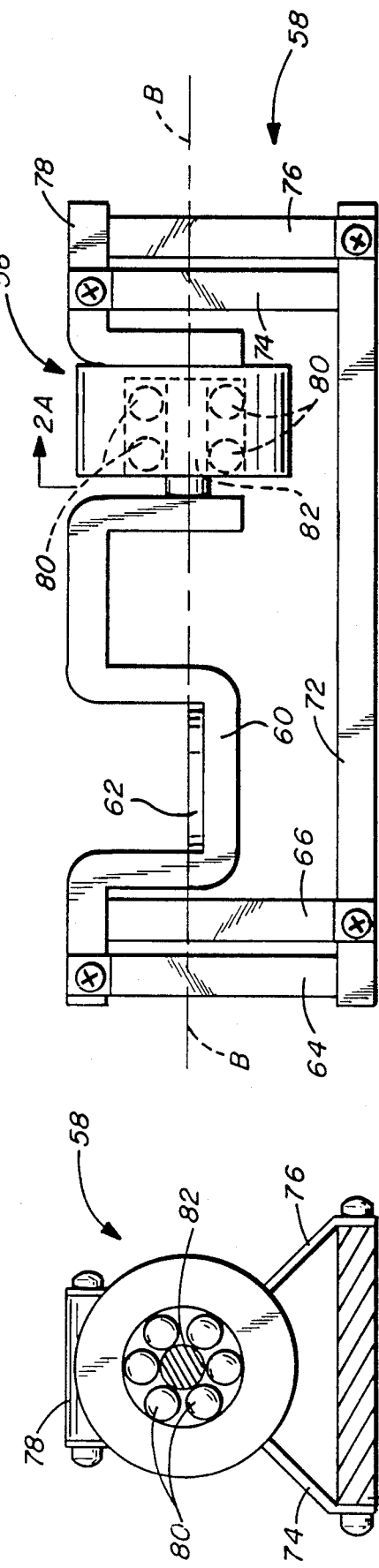

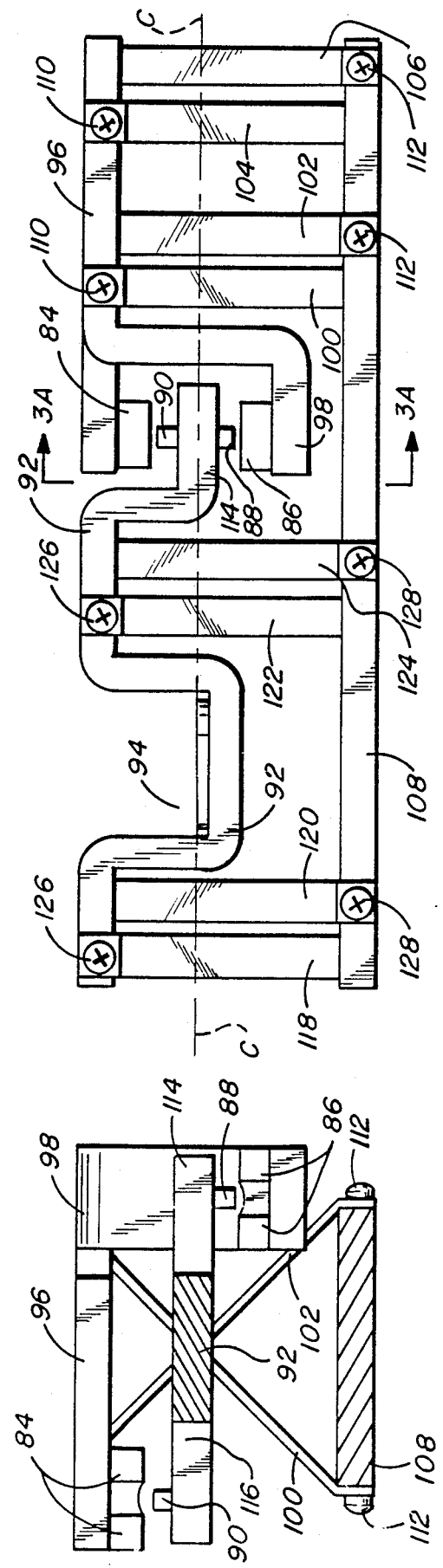

SUSPENSION ASSEMBLY FOR A SCANNING MIRROR

DESCRIPTION

1. Technical Field

The present invention relates generally to apparatus for oscillation of a pivoting mirror and in particular to suspension systems for such apparatus.

2. Background Art

Previously, use has been made of a resonant scanner or a non-resonant galvanometer to angularly displace a mirror having a beam of light incident thereon for the purpose of deflecting the beam of light at a high accuracy and speed. For example, in an apparatus for the detection of flaws on a reflective substrate, such as an unpatterned silicon wafer, a mirror is scanned at a frequency ranging from 80 Hz to 800 Hz. The flaws found by scanning of an unpatterned wafer include minute particles which would be detrimental to proper operation of an integrated circuit chip produced from the wafer.

To obtain a raster-type scan pattern of a wafer being inspected, typically a laser source emits a beam of light onto a mirror with a horizontal pivot axis and the mirror is oscillated electromechanically. The wafer is then caused to move in a direction perpendicular to the scan of the mirror, thereby providing a raster-type scan pattern of the wafer being inspected.

In the examination of a wafer for minute particles, successive scans must be highly accurately spaced. Inaccuracies may be caused by less than smooth horizontal oscillations, i.e. oscillations in the direction of mirror movement. These horizontal oscillations are known in the art as "jitter". Additionally, inaccuracies in examination may result from wobble, i.e. vibrations having a component perpendicular to laser scanning caused by oscillation of the mirror.

In recent years, great advances have been made in reducing undesired vibrations. Initially, mirror suspensions having ball bearings were employed, but such suspensions have been replaced by elastic suspensions. Elastic suspensions reduce the driving energy for rotational motion of the mirror since the high Q factor provides for less energy loss and better achieves precisely repeatable characteristics. Such a suspension may consist of a flexure strip having a torsional stiffness substantially less than a radial or axial stiffness. The flexure suspension imposes a restorative force urging a mirror assembly from a deflected condition to the rest position of the assembly.

U.S. Pat. No. 3,932,809 to Frank discloses a deflection galvanometer for use in high speed data recording and retrieval systems. A flexible member having a mirror fixed to one end is caused to flex, thereby deflecting a beam of light at an angle corresponding to the amount of flexure. U.S. Pat. No. 4,708,420 to Liddiard teaches a focal plane scanning device having three flexure members. As a structure such as a mirror assembly which is supported by a flexure is pivoted by a motor, the flexure bends to provide an axis of rotation parallel the structure. It is also known to pair flexures in order to increase stability, each pair of flexures being crossed to connect a fixed member to a pivoting member.

While elastic suspensions decrease wobble due to excitation transverse to the oscillation of a mounted mirror, a certain amount of wobble is still present. Forces exerted on the fixed member by the bending flexures and by operation of the motor cause vibration of the entire system. Although the vibrations are minor, in applications such as examination of a wafer for minute particles the vibrations are clearly detrimental.

It is an object of the present invention to further reduce vertical vibration, i.e. wobble, in a scanning mirror or the like.

DISCLOSURE OF THE INVENTION

The above object has been met by a device which compensates for the leakage of vibrational energy from a flexure member to a fixed body. This is achieved by balancing torsional force generated by periodic reversal of movement of a mirror assembly against forces opposite in angularity, so that no net force is exerted on the fixed body. Consequently, errors resulting from vibration of the fixed body are minimized.

A first pair of generally rectangular flexure legs are crossed in spaced apart relation and are each attached at a first end to a fixed body. The free ends of the flexure legs are connected to a vibratory body which supports a mirror. Typically, the vibratory body is a motor armature. Angular displacement of the vibratory body is provided by a driver, such as a motor stator, in magnetic communication with the armature. The magnetic driver oscillates the mirror about an axis of rotation and is joined to the fixed member by a second pair of crossed, spaced-apart flexure legs.

Operation of the magnetic driver causes horizontal oscillation of the mirror as the first pair of flexure legs bend in one direction and then the other at a resonant frequency. Simultaneously, the force exerted by the magnetic driver results in bending of the second pair of flexure legs in directions 180° out of phase with the first pair of flexure legs. The first pair of flexure legs and the mass which is supported have characteristics corresponding to the characteristics of the second pair and associated mass such that identical resonant frequencies are obtained. The counter-phase relationship insures that substantially no net force is exerted on the fixed body.

The magnetic driver may be within a motor body having bearings which support the armature within the body of the motor, or may be of the air gap type typically found in resonant optical scanners. Moreover, the present invention may be used in non-resonant galvanometers.

An advantage of the present invention is that substantially no net force is exerted on the fixed body. Typically, the fixed body includes a mechanism to move a wafer or other body to be inspected in a direction transversely with respect to the movement of the mirror. Consequently, any movement of the fixed body would be translated to the object being inspected. The vibration energy leaking to the fixed body would result in errors from wobble. The present invention, however, provides equal and opposite torques for cancellation of forces on a fixed body and such errors are greatly reduced.

BRIEF DESCRIPTION OF THE DRAWINGS

FIG. 1 is a side view of a mirror suspension system in accord with the present invention.

FIG. 1A is an end view of the suspension system of FIG. 1 taken along lines 1A—1A.

FIG. 2 is a side view of a second embodiment of a mirror suspension system in accord with the present invention.

FIG. 2A is a sectional view of the suspension system of FIG. 2 taken along lines 2A—2A.

FIG. 3 is a side view of a third embodiment of a mirror suspension system in accord with the present invention.

FIG. 3A is a sectional view of the suspension system of FIG. 3 taken along lines 3A—3A.

BEST MODE FOR CARRYING OUT THE INVENTION

With reference to FIGS. 1 and 1A, a scanning device 10 is shown. Such a device can be used for flaw detection of a wafer or other uses. The scanning device 10 includes a stationary body or base 12, a pivoting body 14 and an electromagnetic driver 16. A mirror 18 is fixed within the recess of a U-shaped portion of the pivoting body 14. In addition to the U-shaped portion, the pivoting body includes diverging support wings 20 and 22 which extend parallel to the stationary body 12 and includes an inwardly directed armature mount 24.

A drive shaft 26 of an armature 28 is fixed to the inwardly directed armature mount 24 of the pivoting body 14. The armature 28 is mounted within the electromagnetic driver 16 for rotation about an axis defined by drive shaft 26. The driver 16 is of the type commonly used in resonant optical scanning devices. Direction of current flow through the electromagnetic driver induces the armature 28 to rotate in a back-and-forth manner for oscillation of the mirror 18. The electromagnetic driver is of the bearingless air-gap type. The armature 28 is spaced apart from the stator by an air gap 30, shown in FIG. 1. Magnetic flux crosses the air gap 30 to rotate the armature 28. A bearingless motor experiences less energy loss and causes less wobble than a motor in which the armature is mounted to a stator by bearings.

The pivoting body 14 is mounted to the stationary body 12 in spaced-apart relation by a flexural suspension that includes a first pair of flexure legs 32 and 34 and a second pair of flexure legs 36 and 38. The pairs of flexure legs 32-38 support the pivoting body 14 at opposite sides of the mirror 18 to provide a stable suspension. The flexure legs of each pair of flexure legs extend diagonally and in spaced-apart relation to each other. The diagonally extending flexure legs 32-38 are each fixed at opposed sides of the stationary body 12 and a support wing 20 and 22 by a machine screw 40 and 42, respectively.

Operation of the electromagnetic driver 16 will urge the pivoting body to oscillate about axis A, as shown in FIG. 1. The flexure members 32-38 have a torsional stiffness which is substantially less than a radial stiffness. That is, the flexure legs have a flexibility which permits oscillation of the pivoting body 14 about axis A, but have a comparatively great stiffness to movement in other directions. Thus, as the drive shaft 26 is moved in a back-and-forth manner, each of the flexure legs 32-38 bends. In this manner, the flexure legs act as a suspension system, permitting rotation about the axis A.

Previous to introduction of the flexural suspension, a pivoting body of a scanning device was fixed to a driver by ball bearings. By necessity, ball-bearing suspensions require spatial tolerances. As a result, a certain amount of "wobble" was inherent in the ball-bearing suspensions. Wobble is defined as vibrations having a component perpendicular to the desired oscillation of a mirror. Flexural suspensions, unlike ball-bearing suspensions, do not require spatial tolerances. The lack of spatial tolerances reduces excitation of oscillation perpendicular to the sweep of a scanning device 10, thereby eliminating one source of error-causing wobble.

As seen in FIG. 1A, a pair of diagonally extending flexure legs 32-34 is not crossed at a midpoint. Instead, each pair of flexure legs is crossed at a plane defined as being approximately 87% of the length of a flexure leg. The reflective face of the mirror 18 is positioned along this plane. It has been discovered that this arrangement provides a stable axis of flexure leg bending and is in contrast to center-crossing flexure legs which tend to have a floating axis of rotation. The flexure legs of a pair of flexure legs are illustrated as being two separate members. This, however, is not critical. A pair of flexure legs 32-38 may be joined along the side of the stationary body opposite axis A. Likewise, a pair of flexure legs may be joined along a support wing 20 and 22 opposite axis A.

Referring again to FIG. 1, a second flexural suspension supports a mounting bracket 43, to which the stator of the electromagnetic driver 16 is fixed. The second flexural suspension includes a first pair of flexure legs 44 and 46 and includes a second pair of flexure legs 48 and 50. The flexure legs 44-50 are connected to the stationary body 12 by machine screws 52 and are connected to the mounting bracket 43 by machine screws 54. The flexure legs 44-50 of the second flexural suspension have characteristics corresponding to the characteristics of flexure legs 32-38 so that the same resonant frequency is reached during operation. Thus, the length and the Young's modulus of the flexure legs are extremely important. Moreover, moving elements of the scanning device 10 should be dynamically balanced and the center of mass supported by the flexure legs 32-38 and the center of mass supported by the flexure legs 44-50 are intersected by the axis A.

In operation, the electromagnetic driver 16 provides rotational energy to the pivoting member 14, thereby bending the flexure legs 32-38 connecting the pivoting body to the stationary body 12. The length of the flexure legs is such as to cooperate in reaching a resonant frequency. Because the scanning device 10 is highly resonant, and because the flexural suspension provides a restorative force to return the pivoting body from a deflected position to a rest position, only a relatively small percentage of energy is lost from the system. However, the angular forces involved do cause some energy to be transmitted through the flexure legs 32-38 to the rest of the scanning apparatus. If uncorrected, this lost energy will cause wobble of the scanning apparatus.

In wafer flaw detection, a scanning apparatus normally includes a transport mechanism to move an unpatterned wafer in the direction transverse to mirror 18 movement, so as to provide a raster-type scanning as a beam of light is deflected from the oscillating mirror 18. Any angular force transmitted to the scanning apparatus by the flexure legs 32-38 would tend to vibrate the transport mechanism and the resulting wobble would inhibit detection of minute particles which flaw an unpatterned wafer. The scanning device 10 of FIG. 1, however, includes a second flexural suspension characteristically identical to the first flexural suspension. By mounting the electromagnetic driver 16 on a suspension system having flexure legs 44-50, a torque which if equal in magnitude but opposite in direction to the torque of the pivoting body 14 provides balancing compensation so that no net force is experienced by the scanning apparatus.

While the bearingless motor of FIG. 1 is preferred, the counter-pivoting flexural suspensions may be utilized with a bearing motor 56 such as that shown in FIGS. 2 and 2A. The scanning device 58 includes a pivoting body 60 identical to that used in conjunction with an air-gap type motor. A mirror 62 is fixed within the U-shaped portion of the pivoting body 60 for oscillation about axis B. Flexure legs 64 and 66 support the pivoting body in spaced-apart relation to a stationary body 72. The flexure legs extend diagonally and cross along the plane defined by axis B.

Likewise, a pair of crossed flexure legs 74 and 76 support an L-shaped bracket 78 of the motor 56. Additional support for the scanning device 58 is provided by motor bearings 80 disposed between the stator and the armature 82 of the motor 56. The stability provided by bearings 80 at the junction of the motor 56 and the pivoting bodies 60 permit use of a single pair of flexure legs 74 and 76 for suspension of the motor.

Rotation of the armature 82 by the bearing motor 56 provides angular displacement for the mirror 62. Such angular displacement flexes the flexure members 64 and 66 which, at least to some degree, translates forces to the stationary body 72. Suspension of the motor 56 by the crossed flexure legs 74 and 76, however, compensates for forces transferred through the flexure legs of the pivoting body. Again, the scanning device 58 is dynamically balanced and contructed such that equal and opposite torques are exerted by the counter-phase oscillation of the pivoting body 60 and the motor 56.

A third embodiment of the present invention is shown in FIGS. 3 and 3A. Opposed exciter coils 84 and 86 replace the previously described drive means. An alternating current is progressed through exciter coil 84 180° out-of-phase with an alternating current through exciter coil 86. The direction of current flow through the exciter coils attracts or repels poles 88 and 90 which are fixed to a pivoting body 92. Thus, as an exciter coil first attracts then repels an associated pole, the pivoting body 92 oscillates to angularly displace a mirror 94 fixed to the pivoting body. The poles 88 and 90 are made of a ferromagnetic material and upon attraction to an associated exciter coil 84 and 86 are received within an opening in the coil.

The exciter coils 84 and 86 are attached to a mounting bracket 96 having a coil support arm 98. Suspension of the mounting bracket 96 is provided by a first pair of crossed flexure legs 100 and 102 and a second pair of crossed flexure legs 104 and 106. The flexure legs 100-106 are secured between the mounting bracket 96 and a stationary body 108 by machine screws 110 and 112, respectively. Preferably, the flexure legs are made of a material which permits the flexure legs to be used to conduct current to the exciter coils 84 and 86. Conduction of current through the flexure legs eliminates wobble which is caused by undesired vibration of wires to a drive means.

The poles 88 and 90 associated with the exciter coils 84 and 86 project from lateral arms 114 and 116 of the pivoting body 92. The lateral arms 114 and 116 may be made of a ferromagnetic material to enhance response to excitation of the coils 84 and 86. The suspension system of the vibrating body 92 includes a first pair of flexure legs 118 and 120 and a second pair of flexure legs 122 and 124. Machine screws 126 and 128 are used to attach the opposed ends of the flexure legs 118-124 to the pivoting body and the stationary body 108.

As in the embodiments described above, each of the flexure members 100-106 and 118-124 has a torsional stiffness which is substantially less than a radial stiffness. That is, the flexure legs have a flexibility permitting oscillation of the pivoting body 92 and the mounting bracket 96 about a pivot axis C, but the flexure legs have a comparatively great stiffness to movement in any other direction. Again, the two suspended masses are dynamically balanced. In operation the buckling distortion of the flexure legs reaches a resonant frequency and translates torque from the associated suspended mass to the stationary body 108. Any torque exerted through the flexure members 118-124 supporting the pivoting body 92, however, is balanced by a torque equal in magnitude but opposite in direction exerted through the flexure members 100-106. Thus, the net force experienced by a scanning device is significantly reduced and possibly eliminated.

While the present invention has been described with reference to a scanning system for inspecting a wafer, the counter-pivoting flexural suspensions may be used in other applications. For example, the suspension may be utilized in conjunction with a galvanometer scanning at a non-resonant frequency in scanning film, materials and various manufactured articles. Moreover, as noted above, a pair of flexure legs may be a unitary member, the legs being joined at one or both ends. However, in such an embodiment it is not possible to use a single pair of flexure legs to conduct current to an electromagnetic drive motor.

I claim:

1. Oscillatory scanning apparatus comprising,
   a fixed body,
   a first and a second flexural suspension, each having a least one pair of spaced apart, crossed flexure legs, each flexure leg having a first end attached to said fixed body and having a second end and a radial stiffness exceeding a torsional stiffness,
   a vibratory body secured at said second ends of said first flexural suspension in spaced-apart relation to said fixed body, said vibratory body having a reflector means mounted thereon, and
   a drive means for varying the angular position of said vibratory body about an axis of rotation defined by distortion of said flexure legs of said first flexural suspension, said drive means mounted on said second ends of said second flexural suspension in spaced-apart relation to said fixed body for oscillation about said axis of rotation, thereby providing a force on said fixed body which is substantially equal in magnitude and opposite in phase to a force exerted by angular displacement of said vibrating body.

2. The oscillatory scanning device of claim 1 wherein said reflector means is a mirror mounted for rotation about said axis of rotation.

3. The oscillatory scanning device of claim 2 wherein said first and said second flexural suspensions each include two pairs of crossed flexure legs, said pairs of flexure legs of said first flexural suspension disposed on opposed sides of said mirror, each pair of crossed flexure legs having characteristics corresponding to characteristics of the other pair of crossed flexure legs to flex at a substantially identical frequency.

4. The oscillatory scanning device of claim 1 wherein said drive means is an electromagnetic driver and said vibratory body includes a drive shaft operatively connected to said electromagnetic driver.

5. The oscillatory scanning device of claim 4 wherein said electromagnetic driver and said vibratory body each have a center of mass at least closely proximate said axis of vibratory body rotation.

6. The oscillatory scanning device of claim 1 wherein said crossed flexure legs each has a generally rectangular configuration and are substantially identical dimensionally.

7. A suspension assembly for a scanning device having a vibratory body having a reflector surface pivotally driven by a motor means attached to a fixed body, comprising,
a first pair of elongate flexure legs having first ends connected to a fixed body and having second ends attached to a vibratory body, said first pair of flexure legs crossing in spaced apart relation,
a second pair of crossing elongate flexure legs coextensive said first pair having first ends connected to said fixed body and having second ends mounted to a motor means for rotating said vibratory body about a pivot axis, said first and second pair of flexure legs having a flexibility permitting oscillation of said vibratory body and said motor means about said pivot axis while having a comparatively great stiffness to movement in other directions, said first and second pairs of flexure members translating angular forces on said fixed body substantially equal in magnitude and opposite in direction.

8. The suspension assembly of claim 7 further comprising a third pair of crossing elongate flexure legs having first ends mounted to said fixed body, said vibratory body having a reflector surface parallel said pivot axis, said third pair of flexure legs having second ends mounted to said vibratory body on a side of said reflector surface opposite said first pair.

9. The suspension assembly of claim 7 further comprising an additional pair of crossing elongate flexure legs having first ends mounted to said fixed body, said motor means being an electromagnetic driver having first and second exciter coils, said second pair of flexure legs fixed to said electromagnetic driver opposite said additional pair of flexure legs.

10. The suspension assembly of claim 7 wherein said flexure legs each have known axial, radial and torsional stiffness, said torsional stiffness exceeded by said axial and radial stiffness.

11. The suspension assembly of claim 7 wherein said flexure legs are generally rectangular spring metal members and are substantially identical.

12. A scanning mirror assembly for flaw detection or the like comprising,
a stationary member,
at least two pairs of flexure legs, the flexure legs of a pair of flexure legs crossing in spaced apart relation, each flexure leg having a first end fixed to said stationary member and having a radial stiffness exceeding a torsional stiffness, said pairs of flexure legs each including a first and a second flexure leg substantially parallel the associated flexure leg of the other pair,
a pivoting body fixed to second ends of said first pair of flexure legs opposite said first ends, said pivoting body having a mirror connected thereto,
a drive means for angularly displacing said pivoting body along an axis of rotation defined by distortion of said pair of flexure legs, said drive means fixed to second ends of said second pair of flexures for oscillation about said axis of rotation, thereby fixed to exert a torque on said stationary body in phase opposition to the torque exerted by said pivoting body, said torques being substantially equal, said pivoting body and said drive means having a center of mass at least closely proximate said axis of rotation.

13. The scanning device of claim 12 wherein said drive means angularly displaces said pivoting body in an oscillatory manner and at a resonant frequency.

14. The scanning device of claim 12 wherein said drive means is an electromagnetic motor and said pivoting body includes a drive shaft operatively connected to said electromagnetic driver.

15. The scanning device of claim 12 wherein said flexures are generally rectangular.

16. The scanning device of claim 12 wherein said first pair of flexures have characteristics corresponding to characteristics of said second pair of flexures for torsional flexure at substantially identical resonant frequencies.

* * * * *